United States Patent

[11] 3,614,236

| | | | | |
|---|---|---|---|---|
| [72] | Inventors | Adolf Steinemann<br>Moillesula, Geneva;<br>Jack Rufenacht, Lausanne, both of<br>Switzerland | | |
| [21] | Appl. No. | 823,652 | | |
| [22] | Filed | May 12, 1969 | | |
| [45] | Patented | Oct. 19, 1971 | | |
| [73] | Assignee | Societe Genevoise D'Instruments De<br>Physique | | |
| [32] | Priority | May 17, 1968 | | |
| [33] | | Switzerland | | |
| [31] | | 7,408/68 | | |

[54] APPARATUS FOR MEASURING LENGTH BY OPTICAL INTERFEROMETRY
4 Claims, 1 Drawing Fig.

[52] U.S. Cl. .................................................... 356/112
[51] Int. Cl. .................................................... G01b 9/02
[50] Field of Search .......................................... 356/106–113

[56] References Cited
UNITED STATES PATENTS

| 3,377,912 | 4/1968 | Yates | 356/112 |
| 3,374,704 | 3/1968 | Granger | 356/112 |

OTHER REFERENCES

Theoretical Physics; Georg Toos; Hafner, 1950, pg. 67–68
Modern Interferometers, Candler, Hilger & Watts Ltd. 1951 pg. 216

*Primary Examiner*—Ronald L. Wibert
*Assistant Examiner*—Conrad Clark
*Attorney*—Waters, Roditi, Schwartz & Nissen

ABSTRACT: A broad laser beam is directed at a given slight angle of incidence onto a plane mirror for reflecting the beam to produce a zone of overlap. Interference fringes are produced on a linearly displaceable detecting surface arranged parallel to the mirror in the zone of overlap. The angle of incidence is corrected according to a given relation as a function of variations of the refractive index of the medium through which the incident and reflected beams pass, thereby to annul the effect of said variations.

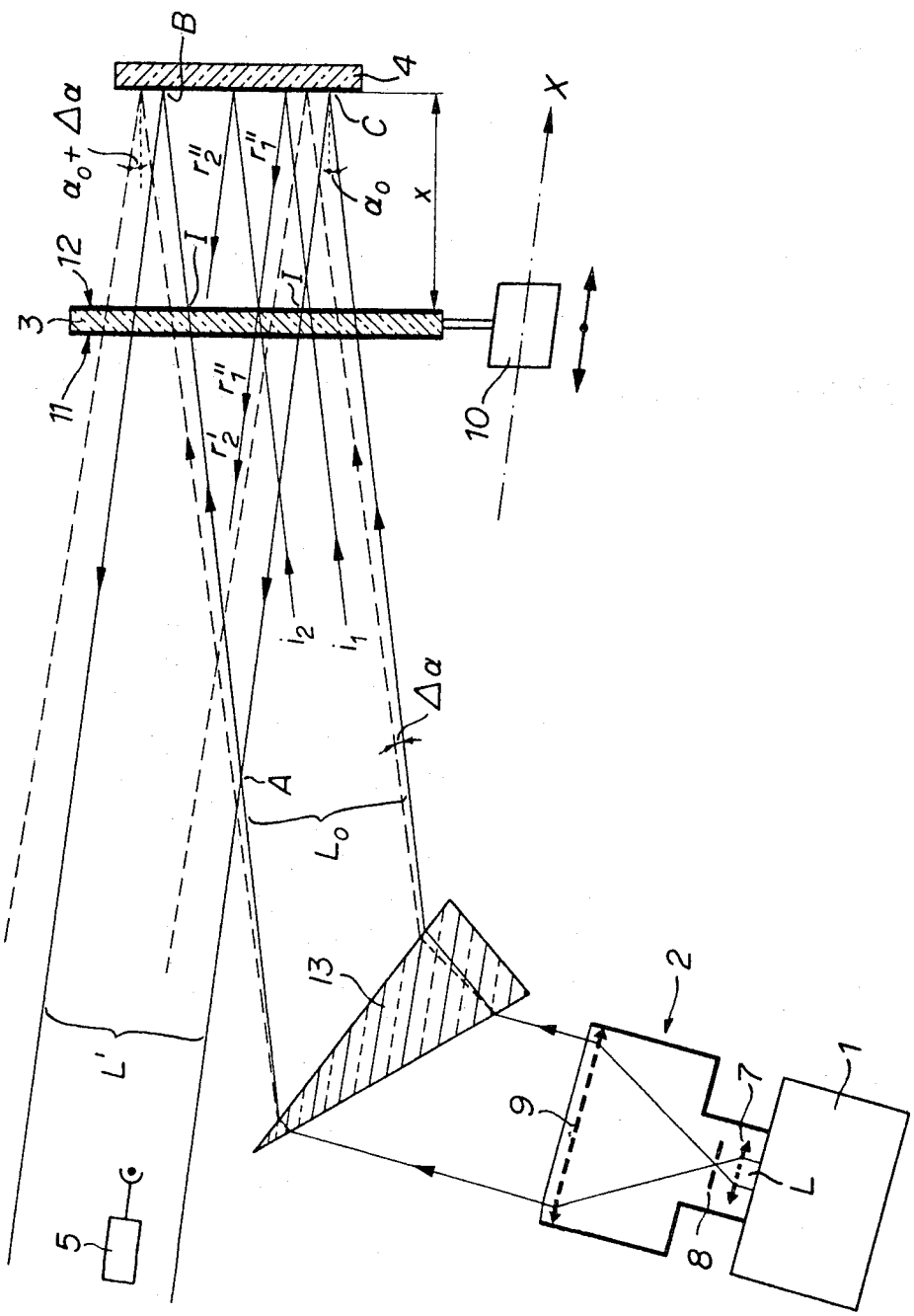

APPARATUS FOR MEASURING LENGTH BY OPTICAL INTERFEROMETRY

This invention relates to measurement of length by an optical interferometer apparatus.

As is known, the wavelength of the light of the beams in an optical interferometer depends on the refractive index of the medium through which they pas and this index varies as a function of ambient conditions. Thus, in view of the fact that the length to be measured corresponds to the number of fringes counted multiplied by this wavelength, variations of the refractive index of the ambient medium must obviously be taken into account in order to ensure precise measurements. It is an essential object of the invention to allow compensation of said variations of the refractive index of the surrounding medium.

The invention relates in particular to an optical interferometer apparatus measuring length comprising:
a. a laser effect generator equipped with beam broadening means;
b. a plane mirror arranged to receive a broad laser beam from said generator, at a given small angle of incidence ($\alpha$), and to reflect said beam, so as to form a zone of overlap between the incident and reflected beams;
c. a transparent optical element arranged between said generator and said mirror, said element having a plane surface facing said mirror and extending substantially in parallel relationship thereto within said zone of overlap;
d. means for displacing said optical element towards or away from said mirror along a linear path within said zone of overlap so as to maintain said parallel relationship;
e. means for detecting and counting interference fringes on said plane surface upon displacement of said element; and
f. correcting means for varying said angle of incidence ($\alpha$) as a function of each variation ($\Delta n$) of the refractive index of the medium through which said beams pass with respect to a mean value ($n$), said correcting means being adapted to vary said angle of incidence ($\alpha$) by an amount $\Delta\alpha$ in accordance with the relationship of $(\Delta n/n) = \Delta\alpha \cdot \tan \alpha$.

An embodiment of an apparatus according to the invention is shown schematically in the accompanying drawing.

The apparatus comprises a laser effect generator 1 equipped with a beam broadening device 2 for directing a broad beam Lo of collimated, monochromatic, coherent light, through a correcting device 13 in form of a prism and a plane glass plate 3 having parallel faces, obliquely towards a plane fixed mirror. The apparatus further comprises a detector 5, comprising photoelectric cells for example, for observing the back face 12 of plate 3 through the latter. The detector 5 includes means for counting the interference fringes detected on the face 12.

Generator 1, which will hereinafter be referred to by the term laser and serves as source of collimated, monochromatic, coherent light at high intensity, may in the present case be a laser of the Ne - He gas type emitting continuously a light beam L, of which the wavelength has a mean value $\lambda_0$ of about 0.633/umin air at 20°C. and 760 mm.Hg. These values will be considered hereinafter to correspond to the average conditions provided for operation of the apparatus. Device 2 for broadening beam L to provide broad beam Lo comprises an eyepiece 7, a diaphragm 8 and an objective 9.

The transparent plate 3 is rigidly connected with a carriage 10 serving to displace it parallel to itself and to mirror 4 along a linear path represented in the drawing by the axis X which in the present case is parallel to the reflected beam L'. This plate 3 is formed of a transparent material, glass in the present case, the refractive index of which differs substantially from that of the surrounding medium, through which the beams pass, namely air in the present case. Plate 3 is provided on one side with a thin antireflecting layer 11 arranged at the front and on the other with a thin reflecting layer 12 arranged at the back; these layers may consist of deposits of suitable material, for example thin deposits of cryolite and gold, respectively. Layer 11 serves to eliminate parasitical rays reflected at the front and layer 12 serves to increase the part reflected by the back, towards the interior of plate 3.

Between the incident beam Lo directed at an angle of incidence $\alpha$ towards mirror 4 and beam L' reflected by the latter, a zone of overlap occurs which is bounded by triangle ABC in the plane of the drawing. The light of the reflected beam L' has an amplitude substantially equal to that of the incident beam Lo and the reflected beam is propagated in the reverse direction of the incident beam, so that the amplitude resulting from superposition of these two beams describes an interference pattern situated in the zone of overlap ABC.

The manner in which an interference pattern is rendered apparent by the plate 3 may be explained as follows:

The sudden variation of the refractive index and the presence of layer 12 at the back plate 3 produce a partial reflection of beam Lo. Thus each incident ray i forming a part of beam Lo undergoes partial reflection at the rear face 12 to produce a first reflected ray r' and a second reflection at the surface of mirror 4 to produce a second reflected ray r'' directed towards face 12. Consequently, a reflected ray $r''_1$ springing from an incident ray $i_{01}$, and falling on the rear face 12, in the zone of overlap bounded by triangle ABC, interferes with a reflected ray $r'_2$ springing from another incident ray $i_2$ these rays $r''_2$ and $r'_2$ then passing through plate 3.

Thus, owing to the high transverse spatial coherence of the beam Lo emanating from the laser 1, interference takes place at all points of the surface of intersection I—I of face 12 with the zone of overlap. The intensity of the light coming from this surface I—I and projected through plate 3 thus varies with the distance x between the mirror and face 12 of this plate and this allows the nodes and troughs of the interference pattern to be rendered visible and hence the fringes to be counted when this face 12 passes therethrough on displacement of plate 3.

The choice of angle $\alpha$ and of the width of the incident beam Lo is effected such that the extent of the zone overlap (ABC) in the direction of displacement axis x will be greater than the maximum length to be measured, so as to allow counting the fringes.

When plate 3 is exactly parallel to the mirror 4, the image projected from the zone of overlap and intercepted by the detector 5 will have a flat tint, the intensity of which varies according to the position of face 12 with respect to the mirror. This flat tint allows the position of face 12 to be localized exactly with respect to the mirror 4 when the latter is subjected to an oscillatory movement of which the amplitude is one fringe or thereabout. This modulation allows location of the fringes to be independent of variations of the electrical characteristics of the detector as well as the illumination.

Although, the mobile plane in which the stationary wave is made apparent, face 12 in the present case, is in all cases substantially parallel to the plane of the mirror, a very slight inclination, of the order of a few seconds of arc, of one of these planes with respect to the other provides an image having fringes which move across it when the mobile plane is displaced with respect to the mirror. Such an image allows the sense of displacement of said plane to be detected as well, by means of two detectors, for example photoelectric cells, a quarter of a fringe apart.

The correcting device 13 allows the measurement of length to be effected in a manner substantially independent of random variations of the refractive index of the medium through which the light beams pass. To that end, it causes the angle of incidence $a\alpha_0$ of the beam Lo to vary as a function of the refractive index medium, air in the present case, the homogeneity of which is ensured, such that the distance between the planes of the nodes (or hollows) of the interference pattern produced by the incident and reflected beams Lo and L' remains substantially constant in spite of these variations. As is shown in the drawing, the beam Lo passing through the prism 13 undergoes refraction before being directed, at an angle of incidence $\alpha_0$, towards the plate 3 and the mirror 4, the prism 13 causing this angle to vary by an amount $\Delta\alpha$ when the refractive index n varies by $\Delta n$. The relation satisfied by the prism 13 is the following:

$$-\frac{1}{\lambda}\frac{\Delta\lambda}{\Delta\alpha}=\tan\alpha=\frac{1}{n}\frac{\Delta n}{\Delta\alpha}$$

in which: $\lambda=\alpha_o+\Delta\lambda$ and $\alpha=\alpha_o+\Delta\alpha$, $\lambda_o$ being the wavelength of the light coming from the laser and $\alpha_o$ the angle of incidence, under mean ambient conditions.

The angle $\alpha_o$ must be sufficiently great to allow prism 13 to effect the desired compensation of the effect of variations of the refractive index of the ambient medium by satisfying the above relation. A mean angle of incidence greater than 3° enables satisfactory compensation even for relatively great variations of ambient conditions.

For a mean angle of incidence $\alpha_o=°$, a prism made of glass of the BK 7 type, having an angle of 82°6' between its face of entry, situated on the laser side, and its face of exit satisfies the above relation to within the first order, at minimum deviation, in air. Such a prism provides, for example, for variations of $\pm>$mm.Hg and $\pm1$°C. with respect to mean conditions (720 mm.Hg, 20°C.), a deviation $\Delta\alpha=35,4''$ to compensate the effect of the variation of the refractive index of the air on the wavelength.

It should be noted that the interference fringes may also be made apparent by means of a thin, slightly diffusing layer arranged opposite the mirror 4 on a plane, transparent substrate, such that the beams passing through this substrate and this layer are only slightly disturbed. This layer may consist of discrete diffusing centres.

The substrate may consist, for example, of a plate of BK 7 glass having parallel faces, such as the plate 3 described above, having a refractive index which differs from that of the ambient medium. The diffusing layer may in this case be formed by small regularly spaced cavities arranged on the rear face of this plate, the depth of these cavities then being at least equal to a quarter of the wavelength of the laser.

One may likewise use, as substrate, a transparent plate having parallel faces and substantially the same refractive index as ambient medium and, as diffusing layer, small crystals of M g O deposited on the rear face of this plate.

The ambient medium may also be any other transparent fluid, for example a gas such as argon or a liquid such as silicone oil.

It should be noted that the correcting device may also comprise several prisms and may be placed before the beam broadening means of the laser in order to reduce its dimensions. However, in this case, the factor of expansion of the beam must be taken into account, for example by using a set of prisms.

What we claim is:

1. An optical interferometer apparatus for measuring length, comprising:
   a. a laser effect generator equipped with beam broadening means;
   b. a plane mirror arranged to receive a broad laser beam from said generator, at a small given angle of incidence ($\alpha$), and to reflect said beam, so as to form a zone of overlap between the incident and reflected beams;
   c. a transparent plate arranged between said generator and said mirror and having parallel faces extending substantially in parallel relationship to said mirror within said zone of overlap, said plate being formed of a substance having a refractive index which differs substantially from the refractive index of the ambient medium through which said beams pass;
   d. means for displacing said transparent plate towards or away from said mirror along a linear path within said zone of overlap so as to maintain said parallel relationship;
   e. means for detecting and counting interference fringes on said plane surface upon displacement of said plate; and
   f. correcting means for varying said angle of incidence ($\alpha$) as a function of each variation ($\Delta n$) of the refractive index of the medium through which said beams pass with respect to a mean value ($n$), said correcting means being adapted to vary said angle of incidence ($\alpha$) by an amount $\Delta\alpha$ in accordance with the relationship of $(\alpha n/n)=\Delta\alpha\cdot\tan\alpha$.

2. Apparatus as claimed in claim 1 wherein the angle of incidence is greater than 3°.

3. Apparatus as claimed in claim 1 wherein said correcting means comprises at least one prism.

4. Apparatus as claimed in claim 1 wherein the face of said plate facing said mirror is provided with a thin, slightly reflecting layer.